(12) United States Patent
Sela (10) Patent No.: US 11,433,961 B2
(45) Date of Patent: Sep. 6, 2022

(54) SCOOTER SUPPORTING KIT

(71) Applicant: Zohar Sela, Ramat-Gan (IL)

(72) Inventor: Zohar Sela, Ramat-Gan (IL)

( * ) Notice: Subject to any disclaimer, the term of this patent is extended or adjusted under 35 U.S.C. 154(b) by 67 days.

(21) Appl. No.: 17/113,138

(22) Filed: Dec. 7, 2020

(65) Prior Publication Data

US 2021/0179214 A1 Jun. 17, 2021

(30) Foreign Application Priority Data

Dec. 12, 2019 (IL) .......................................... 271425

(51) Int. Cl.
*B62H 1/02* (2006.01)
*B62K 3/00* (2006.01)
*B62J 15/00* (2006.01)

(52) U.S. Cl.
CPC ................ *B62H 1/02* (2013.01); *B62J 15/00* (2013.01); *B62K 3/002* (2013.01)

(58) Field of Classification Search
CPC ................................. B62H 1/02; B62K 3/002
See application file for complete search history.

(56) References Cited

U.S. PATENT DOCUMENTS

| | | | |
|---|---|---|---|
| 7,654,356 B2* | 2/2010 | Wu | B62K 15/008 296/181.7 |
| 9,302,728 B1* | 4/2016 | Yang | B62K 15/006 |
| 9,604,688 B1* | 3/2017 | Yang | B62K 3/10 |
| 10,407,119 B1* | 9/2019 | Greenberg | B62K 15/008 |
| 2022/0033028 A1* | 2/2022 | McCormick | B62K 19/40 |

* cited by examiner

*Primary Examiner* — Erez Gurari
(74) *Attorney, Agent, or Firm* — Alphapatent Associates, Ltd; Daniel J. Swirsky (57) ABSTRACT

A scooter supporting kit, including at least two stands, ends thereof being extendable from a base of a fork of a front wheel of the scooter, thereby the ends of the stands include at an extended state thereof, together with the front wheel, three points for disposing thereof on the floor by disposing the fork base parallel and near the floor, thereby stably erecting the user riding surface and the handle-bar of the scooter at the folded state of the scooter.

8 Claims, 9 Drawing Sheets

SCOOTER SUPPORTING KIT

CROSS-REFERENCE TO RELATED APPLICATIONS

This application claims the benefit of priority from Israel Patent Application No. 271425, filed Dec. 12, 2019, the disclosure of which is incorporated herein by reference.

TECHNICAL FIELD

The invention relates to the field of motorized scooters.

BACKGROUND

Figure 1:
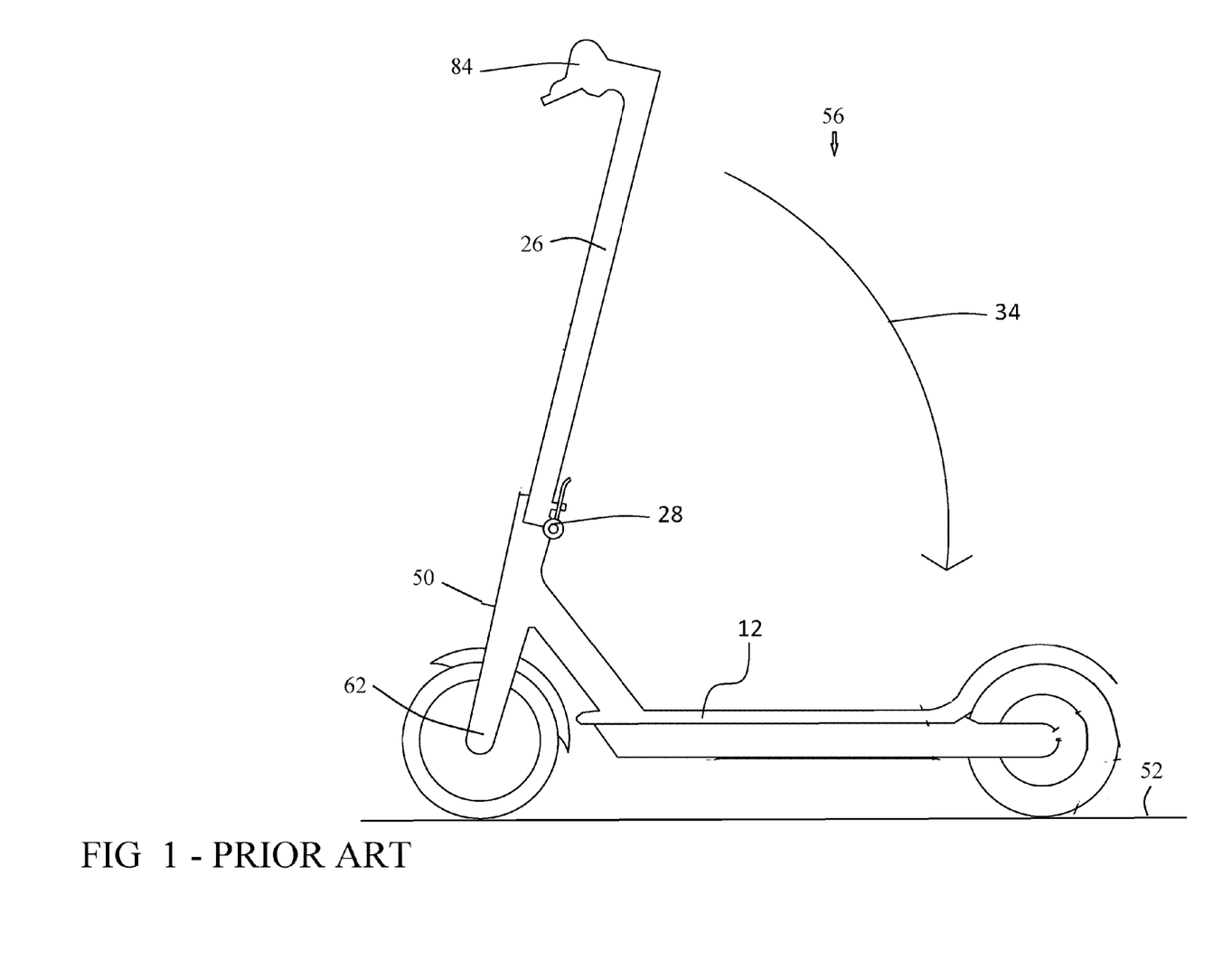
FIG. 1 is a side view of a scooter at a deployed state.

FIG. 1 is a side view of a scooter at a deployed state.

Figure 2:
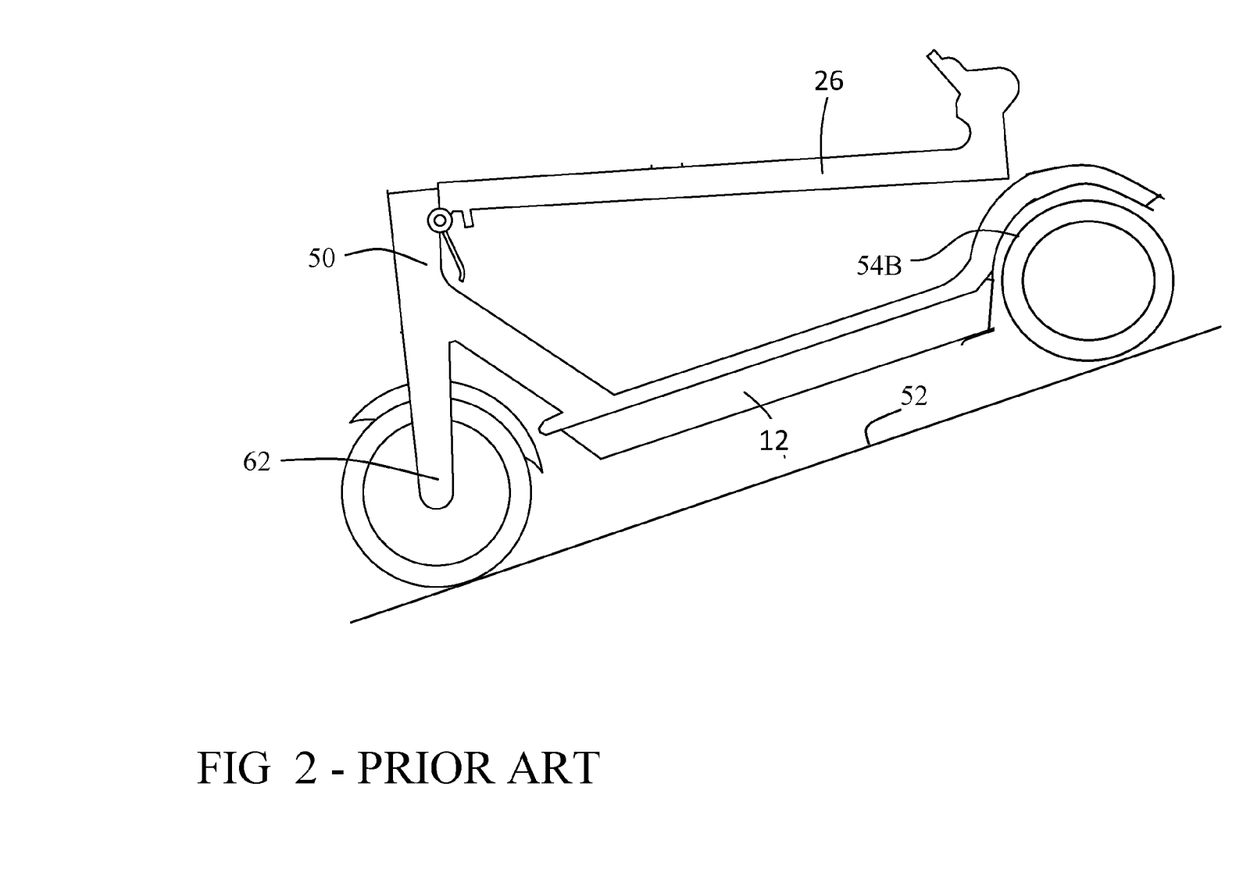
FIG. 2 is a side view of the scooter of FIG. 1 at a folded state.

FIG. 2 is a side view of the scooter of FIG. 1 at a folded state.

A scooter 56, not being accompanied with a supporting kit, is disadvantaged in occupying a significant length along the floor 52, the length being of the user riding-surface 12 and of the handle-bar 26 extending from the base 50 of the fork 62 of the front wheel 54A, at both states.

There is a long felt need to provide a solution to the above-mentioned and other problems of the prior art.

SUMMARY

A scooter supporting kit, including stands, ends thereof being extendable from the base fork of the front wheel.

BRIEF DESCRIPTION OF THE DRAWINGS

Embodiments, features, and aspects of the invention are described herein in conjunction with the following drawings.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 3:
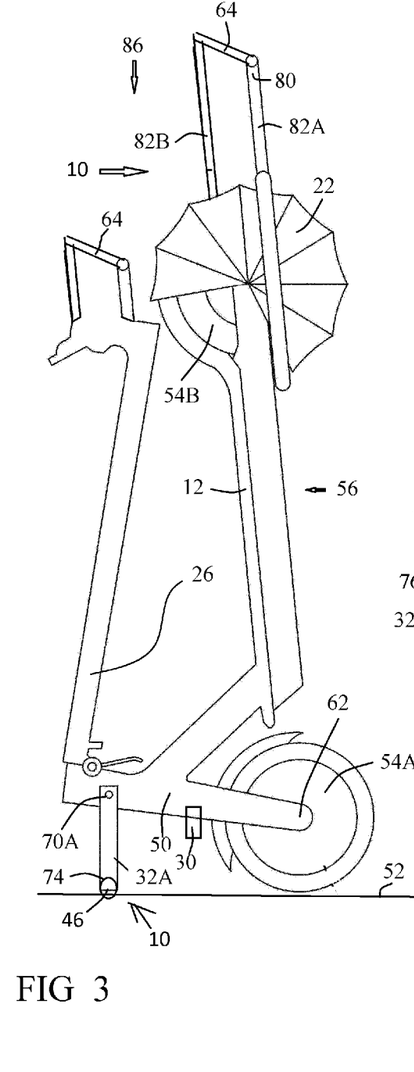
FIG. 3 is a side view of the scooter of FIG. 1 at a new state, being obtained by a scooter supporting kit according to one embodiment of the invention.

FIG. 3 is a side view of the scooter of FIG. 1 at a new state, being obtained by a scooter supporting kit according to one embodiment of the invention.

A scooter supporting kit 10 according to one embodiment of the invention, includes stands 32A and 32B (shown in FIG. 4), being extendable from front wheel fork base 50, for leaning scooter 56 on three points, being stand 32A, stand 32B and front wheel 54A, thus disposing rear wheel 54B above front wheel 54A.

Figure 4:
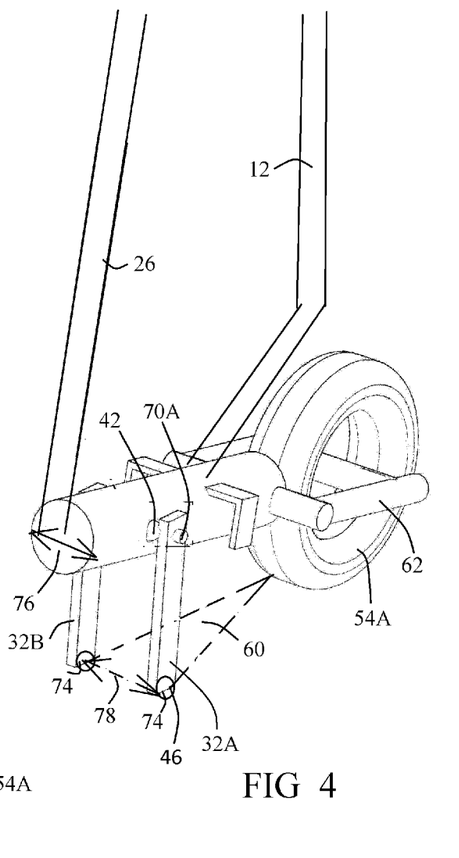
FIG. 4 is a perspective view of the bottom of FIG. 3.

FIG. 4 is a perspective view of the bottom of FIG. 3.

The end 74 of stand 32A, end 74 of stand 32B upon extending, together with front wheel 54A form a virtual triangle 58, forming a virtual triangular surface 60 therebetween, thus allowing supporting front wheel fork base 50 on floor 52, such that user riding-surface 12 and handle-bar 26 extending from front wheel fork base 50 are erected.

The lengths and locations of stands 32A and 32B are to be designed for providing a weight-balanced position at the erected position of scooter 56, utilizing the weight of front wheel 54A containing the electric motor, as conventionally produced, as being the center of weight.

Referring again to FIG. 3, scooter supporting kit 10 may further include a handle 64 disposed beyond rear wheel 54B extending between ends 80 of telescopic rods 82A and 82B, the handle for carrying scooter 56 at the erected position while slightly lifting ends 74 of stands 32A and 32B from floor 52. Handle 64 may extend from riding surface 12 or from handle-bar 26.

Thus, kit 10 provides compact carrying of scooter 56 of which front wheel 54A attached to floor 52; and compact disposition of scooter 56 of which front wheel 54A and ends 74 of stands 32A and 32B attach floor 52.

Ends 74 may includes wheels or balls 46, thus the carrying of scooter 56 may be on front wheel 54A, and on two wheels/balls 46.

Scooter supporting kit 10 may further include a deployable cover 22, for covering rear wheel 54B at a deployed state thereof, for avoiding dirtying the user and the public.

Figures 5, 6:
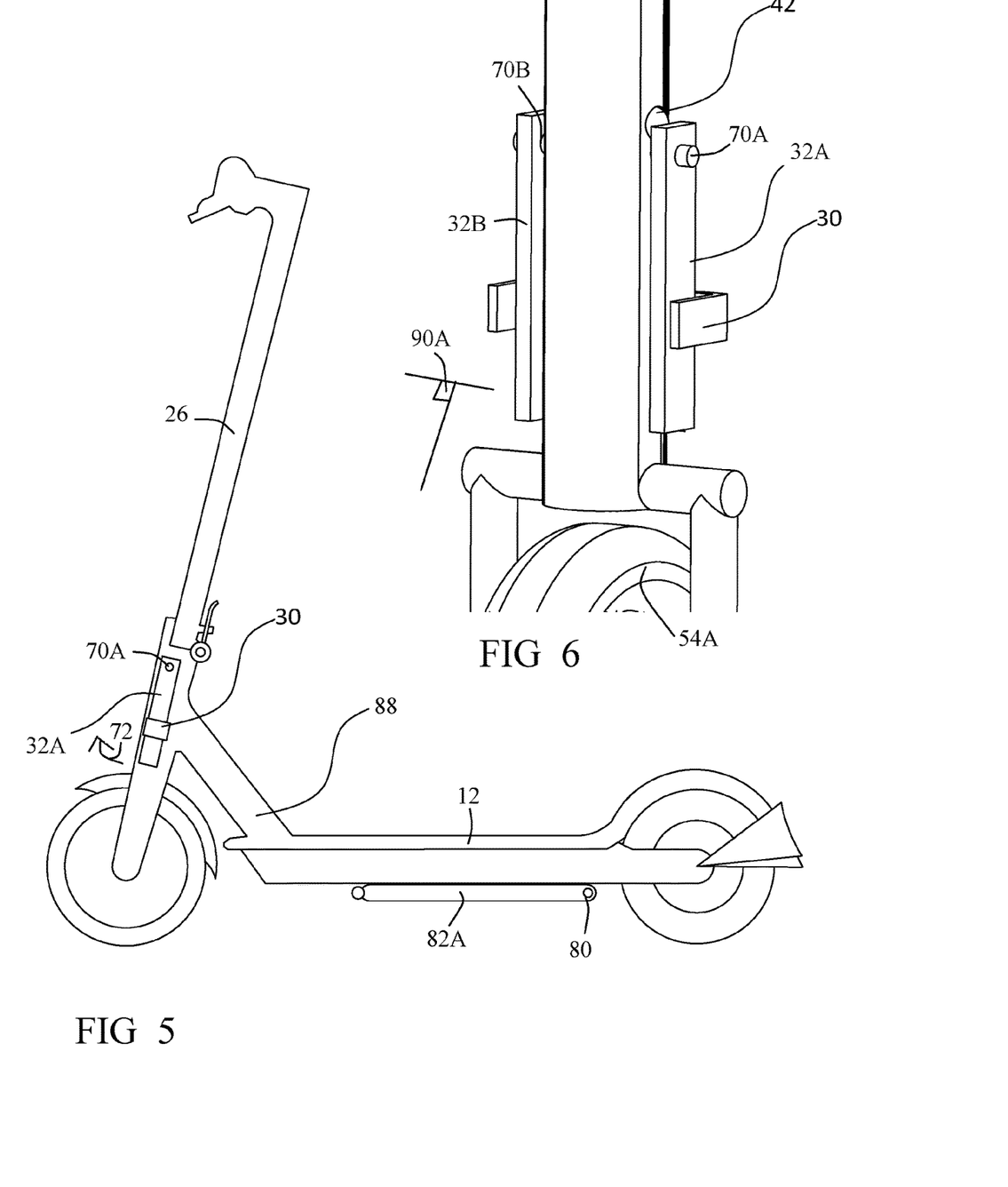
FIG. 5 is the side view of the scooter at the deployed state of FIG. 1, including the supporting kit of FIG. 3 at the folded state thereof.
FIG. 6 is a perspective view of the stands of FIG. 4 at the folded state thereof.

FIG. 5 is the side view of the scooter at the deployed state of FIG. 1, including the supporting kit of FIG. 3 at the folded state thereof.

FIG. 6 is a perspective view of the stands of FIG. 4 at the folded state thereof.

According to this embodiment, stands 32A and 32B are rotatable 72 parallel to one another and to wheel 54A through hinges 70A and 70B directed perpendicular 90A to wheel 54A.

As shown in FIG. 4, the distance 78 between stands 32A and 32B is limited to the width 76 of fork base 50, induced by stands 32A and 32B being rotatable in relation to one another through hinges 70A and 70B, shown in FIG. 6 to be directed perpendicular 90A to wheel 54A.

Figure 7:
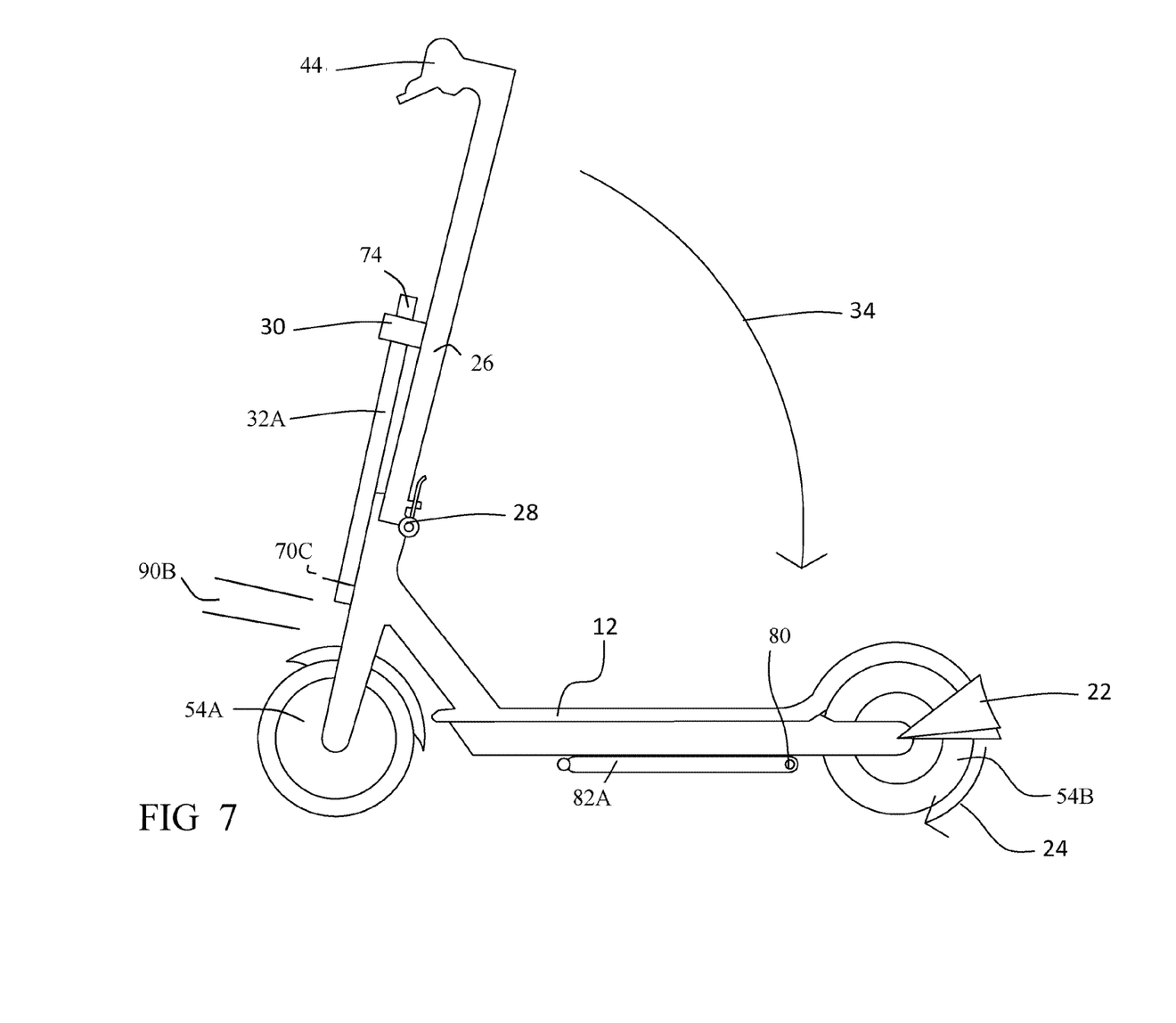
FIG. 7 is the side view of the scooter at the deployed state of FIG. 1, including a supporting kit according to another embodiment, at the folded state thereof.

FIG. 7 is the side view of the scooter at the deployed state of FIG. 1, including a supporting kit according to another embodiment, at the folded state thereof.

According to the embodiment of FIG. 7, stands 32A and 32B are rotatable perpendicular to wheel 54A, thus in relation to one another through a hinge 70C directed parallel 90B to wheel 54A, rather than perpendicular of FIG. 6.

Figure 8:
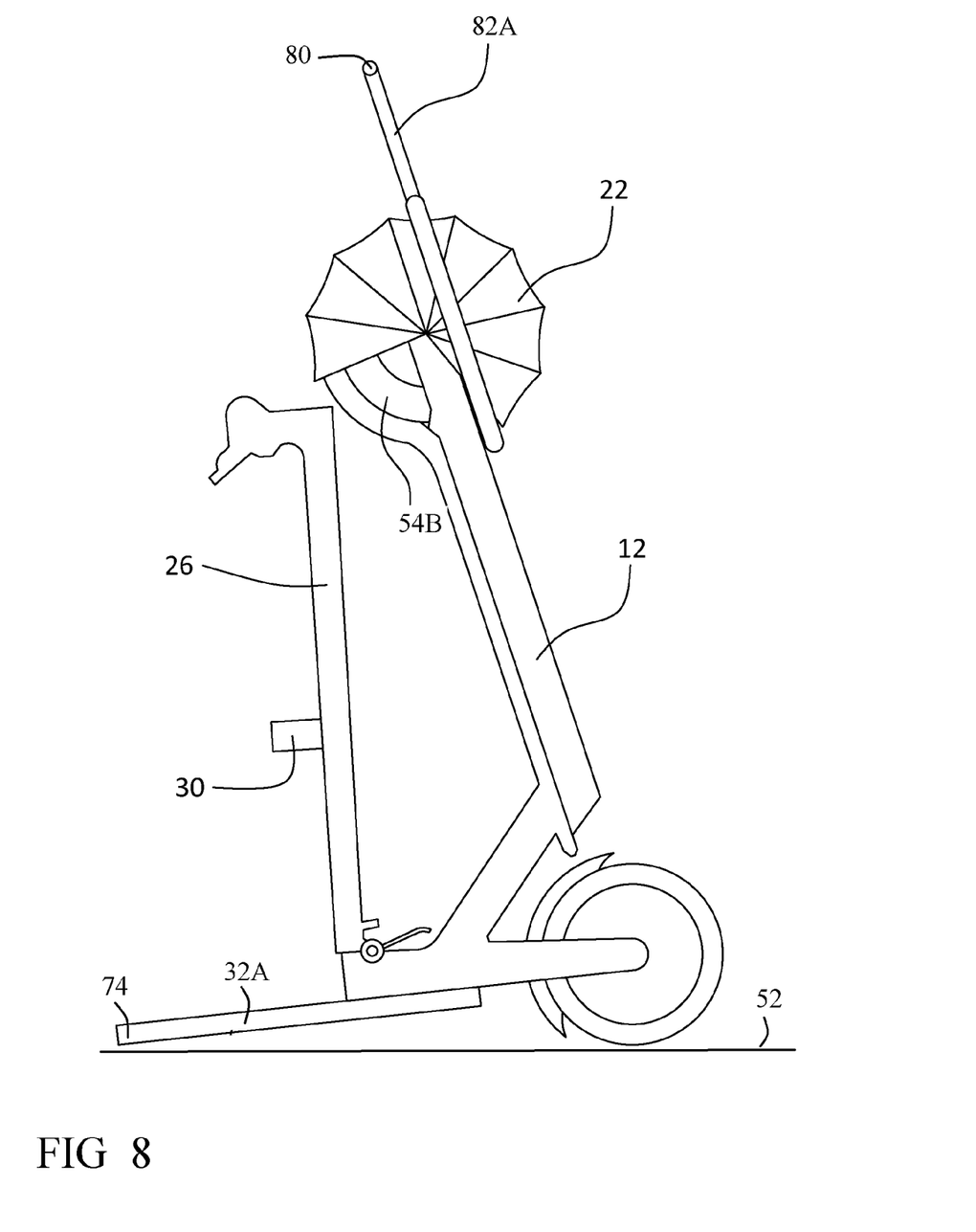
FIG. 8 is a side view of the scooter and the supporting kit of FIG. 7 upon folding the scooter and erecting it, prior to deploying the stands.

FIG. 8 is a side view of the scooter and the supporting kit of FIG. 7 upon folding the scooter and erecting it, prior to deploying the stands.

Figure 9:
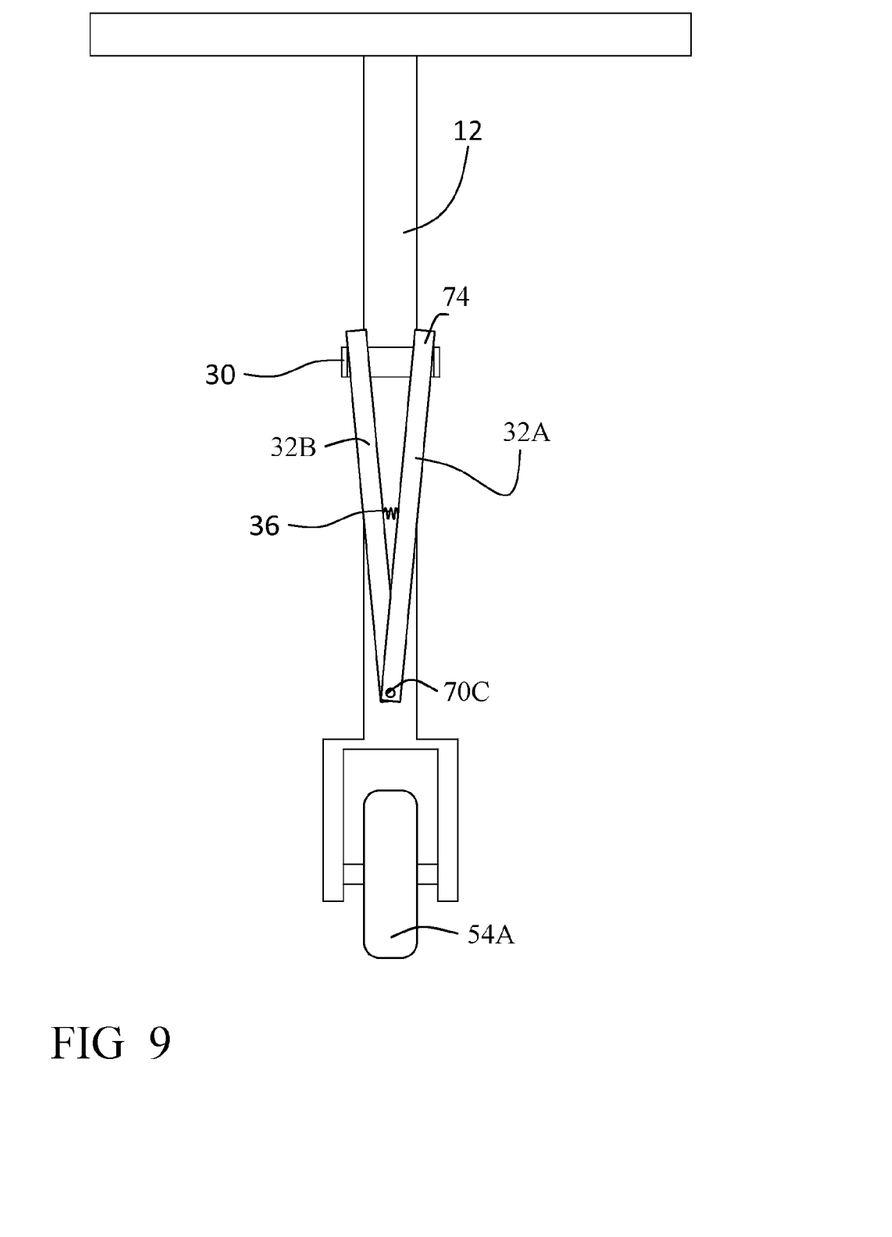
FIG. 9 is a bottom view of the scooter and the supporting kit at the state of FIG. 8.

FIG. 9 is a bottom view of the scooter and the supporting kit at the state of FIG. 8.

A limiting element 30 normally does not allow spring 36, disposed between stands 32A and 32B, to rotate the ends 74 of stands 32A and 32B about hinge 70C away one from the other.

Figure 10:
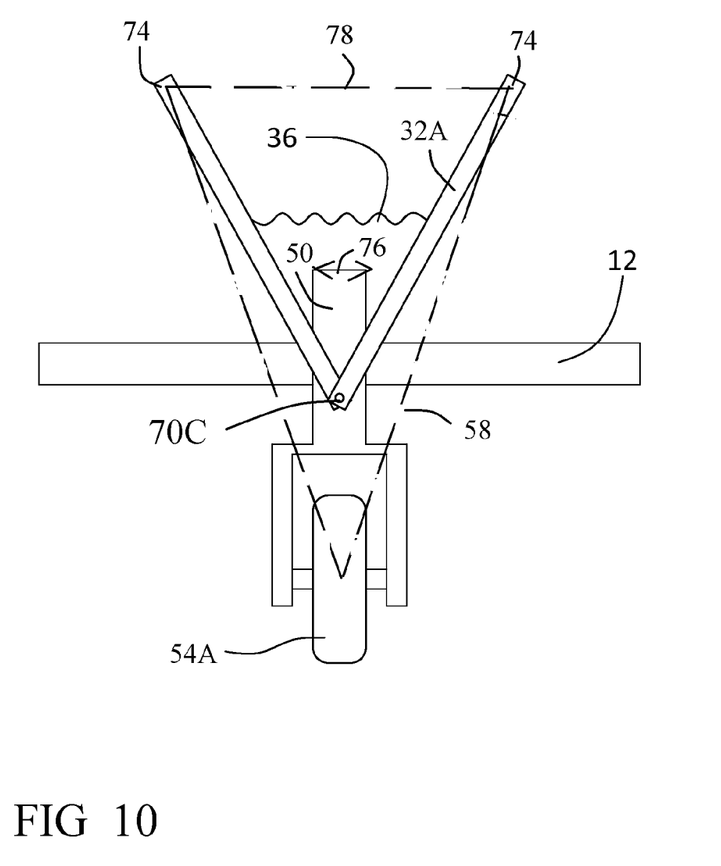
FIG. 10 is the bottom view of the scooter and the supporting kit upon releasing the stands from the limiting element of FIG. 9.

FIG. 10 is the bottom view of the scooter and the supporting kit upon releasing the stands from the limiting element of FIG. 9.

Distance 78 between stands 32A and 32B according to this embodiment is must larger than width 76 of fork base 50, thus virtual triangular 58 here is must larger and provides an advantaged stabilization.

Figure 11:
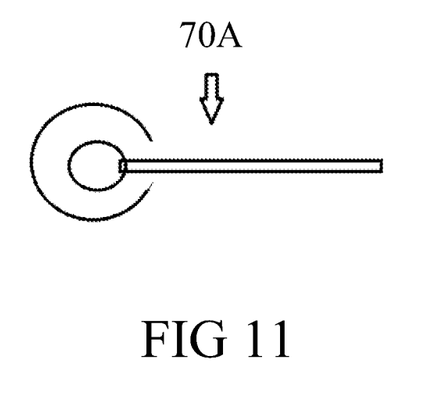
FIG. 11 depicts the hinge according to one embodiment. The drawings are not necessarily drawn to scale.

FIG. 11 depicts the hinge according to one embodiment.

According to another embodiment, combining FIG. 6 and FIG. 7, stands 32A and 32B are rotatable (72) parallel to one another and in relation to one another through hinges 70A and 70B being ball joints, such as of FIG. 11.

Thus, in one aspect, the invention is directed to a scooter supporting kit (10), including:
at least two stands (32A,32B), ends (74) thereof being extendable from a base (50) of a fork (62) of a front wheel (54A) of the scooter (56),
thereby the ends (74) of the stands (32A,32B) include at an extended state thereof, together with the front wheel (54A), three points (58) for disposing thereof on the floor (52) by disposing the fork base (50) parallel and near the floor (52), thereby stably erecting the user riding surface (12) and the handle-bar (26) of the scooter (56) at the folded state of the scooter (56).

The scooter supporting kit (10) may further include:
a handle (64), being disposed beyond the rear wheel (54B) of the scooter (56), for carrying the scooter (56) at a state in which the front wheel (54A) attaching the floor (52) and the handle (64) being disposed at a top of the scooter (56), the state obtained from the erected state of the user riding surface (12) and the handle-bar (26).

The extendibility of the ends (74) of the stands (32A,32B) from the fork base (50), may apply extendibility perpendicular to the front wheel (54A) of the scooter (56),
thereby the extendibility draws the ends (74) of the at least two stands (32A,32B) at the extended state thereof away aside from front wheel (54A), for improving the stability.

The scooter supporting kit (10) may further include:
a deployable cover (22), for covering the rear wheel (54B) of the scooter (56) at the deployed state thereof.
thereby avoiding dirtying at a state including the front wheel (54A) attaching the floor (52) and the rear wheel (54B) being disposed at a top of the scooter (56).

Each of the ends (74) may include a wheel (46) or a ball, thereby the three points (58) as including the wheels (46) of the ends (74) and the front wheel (54A), allow carrying the scooter (56) thereon.

The scooter supporting kit (10) may further include:
at least one hinge (70A, 70B, 70) for rotating the two stands (32A,32B) in relation to the fork base (50), for applying the extending thereof.

The extending of the two stands (32A,32B) may apply rotating thereof parallel to the front wheel (54A) and/or perpendicular to the front wheel (54A).

In the figures and/or description herein, the following reference numerals (Reference Signs List) have been mentioned:
numeral 10 denotes the scooter supporting kit according to one embodiment of the invention;
12: riding surface;
22: deployable cover for covering rear wheel 54B;
24: deploying of deployable cover 22;
26: bar of scooter 56, from which steering handles 84 extend;
28: deployed state lock;
30: limiting element;
32A,32B: stands;
34: folding of scooter 56;
36: spring;
42: springy rounded pressing element, for maintaining the deployed stated of stand 32A;
44: scooter handle;
46: wheel;
50: base of fork 62;
52: floor;
54A: front wheel;
54B: rear wheel;
56: scooter;
58: virtual triangular;
60: virtual triangular surface;
62: fork of front wheel 54A;
64: handle for carrying scooter 56 at the erected folded state 86;
70A, 70B, 70C: hinges which may be ball joints;
72: rotation;
74: ends of stands 32A,32B;
76: width of fork base 50;
78: distance between stands 32A,32B;
80: end of telescopic rods 82A,82B;
82A,82B: rods which may be telescopic;
84: scooter steering handle;
86: erected folded state of scooter 56, obtained by kit 10;
88: bar extending from riding surface 12 and fork base 50;
90A,90B: perpendicular and parallel relations;

The foregoing description and illustrations of the embodiments of the invention have been presented for the purpose of illustration, and are not intended to be exhaustive or to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

What is claimed is:

1. A scooter supporting kit, comprising:
   at least two stands, ends thereof being extendable from a base of a fork of a front wheel of said scooter,
   thereby said ends of said at least two stands at an extended state thereof, together with said front wheel, comprise three points for disposing thereof on a floor by disposing said fork base parallel and near the floor,
   thereby utilizing weight of said front wheel as housing an electric motor, for stably erecting a user riding surface and a handle-bar of said scooter at a folded state of said scooter.

2. The scooter supporting kit according to claim 1, further comprising a handle, being disposed beyond a rear wheel of said scooter, for carrying said scooter at a state comprising said front wheel attaching the floor and said handle being disposed at a top of said scooter, said state obtained from said erected state of said user riding surface and said handle-bar.

3. The scooter supporting kit according to claim 1, wherein said extendibility of said ends of said at least two stands from said fork base, comprises extendibility perpendicular to said front wheel of said scooter, thereby said extendibility draws said ends of said at least two stands at said extended state thereof away aside from front wheel, for improving said stability.

4. The scooter supporting kit according to claim 1, further comprising a deployable cover, for covering a rear wheel of said scooter at a deployed state thereof, thereby avoiding dirtying at a state comprising said front wheel attaching the floor and said rear wheel being disposed at a top of said scooter.

5. The scooter supporting kit according to claim 1, wherein each of said ends comprises a wheel, thereby said three points as comprising said wheels of said ends and said front wheel, allow carrying said scooter thereon.

6. The scooter supporting kit according to claim 1, further comprising at least one hinge for rotating said two stands in relation to said fork base, for applying said extending thereof.

7. The scooter supporting kit according to claim 1, wherein said extending of said two stands comprises rotating thereof parallel to said front wheel.

8. The scooter supporting kit according to claim 1, wherein said extending of said two stands comprises rotating thereof perpendicular to said front wheel.

\* \* \* \* \*